United States Patent Office 3,300,274
Patented Jan. 24, 1967

3,300,274
PROCESS OF TREATING TEXTILES WITH PERFLUOROACYL BIS-(1-AZIRIDINE) COMPOUNDS AND RESULTING TEXTILE PRODUCTS
Allen G. Pittman, El Cerrito, and William L. Wasley, Berkeley, Calif., assignors to the United States of America as represented by the Secretary of Agriculture
No Drawing. Filed Oct. 22, 1963, Ser. No. 318,130
8 Claims. (Cl. 8—127.6)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel organic compounds, namely, fluoroacyl aziridines, in monomeric and polymeric form. The objects of the invention also include processes for treating textiles with the said compounds, and the novel products so produced. Further objects and advantages of the invention will be evident from the following description wherein parts and percentages are by weight unless otherwise specified.

I. PERFLUOROACYL MONO-AZIRIDINES

A first modification of the invention concerns the new compounds of the structure:

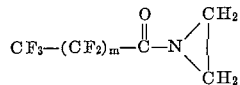

wherein $m$ is an integer from 0 to 18. These compounds are readily prepared by reacting the corresponding perfluoroacyl chloride with ethylene imine, in accordance with the equation:

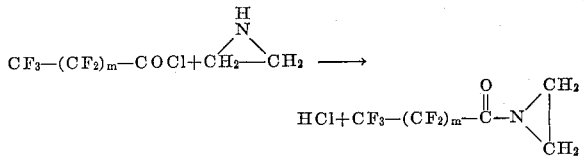

The reaction is preferably conducted in the presence of a base such as sodium hydroxide, sodium carbonate, triethyl amine, pyridine, dimethyl aniline, or other tertiary amine whereby to form a salt with the HCl. The reaction is conducted at a low temperature, e.g., from 10° C. to minus 30° C., in order to minimize or avoid polymerization of the product. It is preferred to carry out the reaction in a conventional inert solvent such as diethyl ether, benzene, toluene, or the like. It is obvious that by varying the type of perfluoroacyl chloride used, one can prepare any desired perfluoroacyl monoaziridine of the type shown.

The perfluoroacyl monoaziridines are very easily polymerized. In fact, the monomers produced by the reactions above described generally contain small amounts of base (for example, the tertiary amine used as an HCl acceptor, or unreacted ethylene imine) which acts as a polymerization catalyst. As a result, the product will polymerize spontaneously if allowed to stand, even at room temperature. If it is desired to preserve the product in the monomeric state it is kept at a low temperature—for example, at minus 20° C. or below—or it is purified by distillation, extraction, or other conventional procedure to remove the accompanying base. In the purified state the products are more stable and can be stored at room temperature, particularly if diluted with an inert solvent. If, on the other hand, the polymers are desired, then the monomer product is not rigorously purified or additional polymerization catalyst—e.g., an alkali metal fluoride, an alkali metal cyanide, or an organic base such as pyridine, morpholine, triethylamine, ethylene imine, etc.—is added. As in other cases, the rate of polymerization is increased by increasing temperature and if the polymerization reaction is too slow at room temperature, it may be accelerated by applying heat, for example, up to temperatures of about 200° C. The structure of the polymer is not known but it is believed to contain repeating units of the structure:

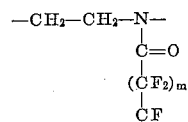

linked to one another in a linear chain.

II. FLUOROACYL BIS-AZIRIDINES

A second modification of the invention concerns the new perfluoroacyl bis-aziridines of the structure:

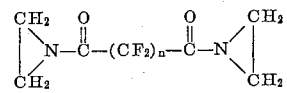

wherein $n$ is an integer from 1 to 10. These bis-aziridines are prepared in a manner analogous to that used for the mono-aziridines described above except that the starting material is a perfluorinated dicarboxylic acid chloride. It is, of course, obvious that the reaction in this case will require two moles of ethylene imine per mole of acid chloride. The conditions of reaction, including the use of an HCl acceptor, etc., are as described for the mono-aziridines. The course of the synthesis is shown below:

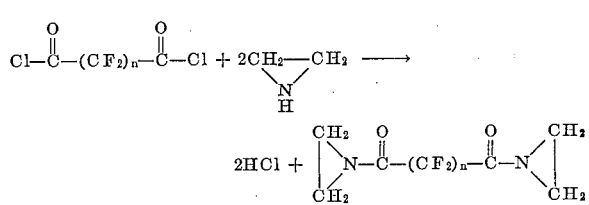

It is obvious from the above equation that by selection of the appropriate acid chloride one can prepare any desired bis-aziridine.

The bis-aziridines are polymerized by the techniques disclosed above for the mono-aziridines, i.e., application of heat with or without added polymerization catalyst. Because of the presence of the two functional groups, the bis-aziridines yield polymers having the characteristics of highly cross-linked, three-dimensional polymers in contrast to the linear polymers obtained from the monoaziridines. Thus, whereas the mono-aziridines yield fusible polymers soluble in solvents such as benzotrifluoride, the bis-aziridines yield polymers which are not fusible and which are insoluble in organic solvents.

III. PERFLUOROALKYL ACYL AZIRIDINES

A third modification of the invention concerns the new compounds of the structure:

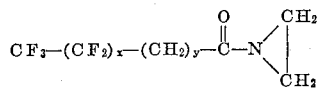

wherein $x$ is an integer from 0 to 18 and $y$ is an integer from 1 to 18. These compounds differ from those of modification I in having an alkylene bridge:

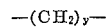

between the perfluorinated moiety and the

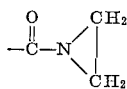

group.

The compounds in question are prepared in a manner analogous to that described for the compounds of modification I, except that the acid chloride will be one containing the alkylene bridge. The conditions of reaction, including the use of an HCl acceptor, etc., are as described for the compounds of modification I. However, in this case higher temperatures, for example, up to about 30° C., may be used because of the lesser tendency of the product to polymerize. The course of the synthesis is shown below:

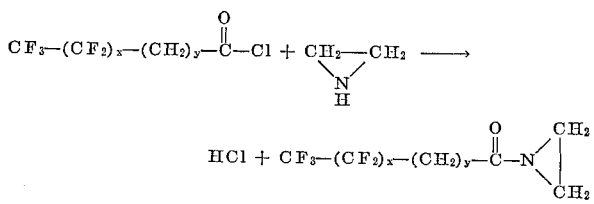

It is obvious from the above equation that by selection of the appropriate acid chloride, one can prepare, if desired, aziridine of the type described.

The monomers of the present modification are substantially more stable (because of the presence of the alkylene bridge) than the compounds of modification I. Thus, these compounds can be stored at ordinary temperatures without polymerization taking place. If, however, it is desired to form the polymers, this is readily accomplished by subjecting them to heat, for example, to temperatures of about 100 to 200° C., preferably for more rapid polymerization, in the presence of a polymerization catalyst, for example, an acid such as sulphuric or hydrochloric, or boron trifluoride. The polymers have the characteristics of linear polymers and although their structure is not known, it is believed that they contain repeating units of the structure:

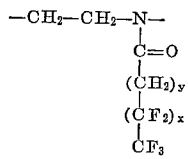

linked together in a linear chain.

*Applications of the fluoroacyl aziridines.*—The fluoroacyl aziridines of the invention are capable of many uses. A primary one is in the treatment of textiles whereby to impart improved properties to the textile, for example, decreased shrinkage when subjected to laundering, increased resistance to becoming soiled, enhanced water repellency and enchanced oil repellency. An outstanding advantage of the procedure is that the improvements so rendered are durable and are retained despite laundering and/or dry cleaning. Moreover, the treatment does not cause any degradation of the textile so that there is no significant loss of tensile strength, abrasion resistance, resiliency, elasticity, etc. Ordinarily, in such application the aziridine in monomeric form is applied to the textile. For example, the monomer is dissolved in a conventional volatile, inert solvent such as benzene, toluene, benzotrifluoride, or the like, and the solution is distributed on the textile in conventional manner, for example, the textile is dipped in the solution and then run through padding rolls to express excess solution therefrom. Generally, the amount of residual solution in the textile and the concentration of aziridine derivative in the solution are correlated so that the treated textile contains about 0.5 to 20% of the aziridine derivative based on the weight of the texile. Usually, in treating textiles it is desirable to limit the amount of aziridine to about 0.5 to 10%, or even 0.5 to 5%, to attain the desired end, such as increase in soil resistance, without undue interference with the hand of the textile. It is, of course, obvious that residual solvent may be removed from the treated textile by evaporation, for example, applying warm air to the textile. The monomer thus deposited on the textile is then cured, i.e., converted to the polymer by simply allowing the material to stand at room temperature, or, for faster cure, by applying heat, for example, at temperatures of 100–150° C. As noted hereinabove, the monomer will usually contain traces of basic materials—derived from the synthesis—so that no polymerization catalyst is needed. If, however, the monomer is exceptionally pure or if especially rapid cure is desired, a small amount of a polymerization catalyst, such as any of these described above, may be added to the treating solution or be separately applied to the textile after distributing the monomer solution thereon. In a variation of the procedure described above, the solvent for the monomer is in whole or in part a solvent which has the ability to swell the fibers being treated. Typical of such solvents are N,N-dimethyl formamide, dimethyl sulphoxide, dimethyl acetamide, N-acetylmorpholine, N-formylpiperidine, methyl pyrrolidone, γ-butyrolactone, or the like. In another variation of the process, the monomer is emulsified in water, using a conventional emulsifying agent such as polyoxyethylene stearates, polyoxyethylene ethers of sorbitan monolaurate, iso-octylphenyl ether of polyethylene glycol, and the resulting emulsion applied to the textile. In treating textiles as above described, the treating liquid may contain any of the disclosed mono-aziridines, bis-aziridines, or combinations of the mono- and bis-aziridines. Moreover, the treatment liquid may contain, in addition to the compounds of the invention, other compounds which are capable of copolymerization therewith, for example, known compounds containing aziridine groups such as glutaryl bis-(1-aziridine), 2,4,6-tris-(1-aziridinyl)s-triazine, tris-(1-aziridinyl)phosphine oxide, etc.

Although it is generally preferred to apply the arizidines in monomer form to the textile, thus to produce the polymer in situ on the textile fibers, it is within the purview of the invention to apply the aziridine to the textile in the state of a preformed polymer. In such modification of the invention, any of the aforesaid techniques of applying the material to the textile may be employed. Typically, the polymer is dissolved in a volatile, inert solvent, the textile impregnated with the solution, and the solvent removed by extraction or by washing.

The invention may be utilized for improving the properties of all types of textiles, for example, cotton; linen; hemp; jute; ramie; sisal; cellulose acetate rayons; cellulose acetate-butyrate rayons; saponified acetate rayons; viscoe rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts or other non-woven fabrics, garments or garment parts.

An especially significant aspect of the invention is that the aziridines do not form a mere physical coating on the textile fibers but chemically combine with the fiber. Such chemical combination is particularly the case with textiles — such as cellulosic fibers or silk, wool, mohair, and the like — which contain free carboxyl and/or amine groups which provide sites for combination with the reactive aziridine groups. Such reaction is believed to involve opening of the aziridine ring and formation of ester linkages in the event the textile contains free carboxyl groups or formation of secondary amine linkages in the event the textile contains free amino groups. Such combination with the textile, or grafting, as it may be termed is highly desirable as it makes the improvement in properties essentially permanent in that the aziridine polymer is not removed from the textile on laundering or dry cleaning.

Although all of the aziridine compounds, herein described are useful in the treatment of textiles, it is particularly preferred to use certain types of these compounds to yield a high degree of improvement, particularly from the standpoint of enhanced oil repellency and enhanced water repellency, which combination of properties provides the textile with enhanced resistance to becoming soiled when contacted with dirt, food products, grease, etc. These preferred types of compounds are given below:

Modification I: Preferably compounds of the structure:

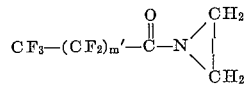

wherein $m'$ is an integer from 3 to 10, and the polymers thereof. Typical monomers in this area are, for example: 1-perfluorovaleryl aziridine, 1-perfluorohexanoyl aziridine, 1-perfluorooctanoyl aziridine, 1-perfluorodecanoyl aziridine, and 1-perfluorododecanoyl aziridine.

Modification II: Preferably compounds of the structure:

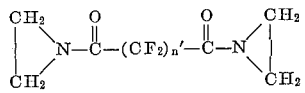

wherein $n'$ is an integer from 5 to 10, and the polymers thereof. Typical monomers in this category are, for example: perfluoropimelyl bis-(1-aziridine), perfluorosuberyl bis-(1-aziridine), perfluoroazelayl bis-(1-aziridine), and perfluorosebacyl bis-(1-aziridine).

Modification III: Preferably compounds of the structure:

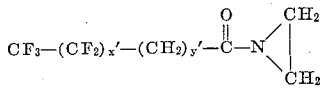

wherein $x'$ is an integer from 2 to 10 and $y'$ is an integer from 4 to 18, and the polymers thereof. Typical examples of monomers in this category are shown in the following list wherein Z stands for the radical

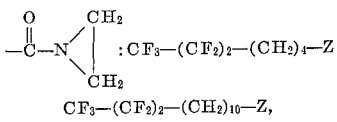

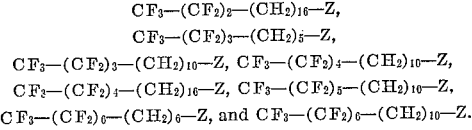

Although the compounds of the invention are primarily useful as textile treating agents, they can be used for other purposes for which polymer and polymer intermediates are generally useful. For example, the aziridine monomers may be converted into resinous polymers which are generally useful in fabricating objects of all kinds such as gaskets, buttons, buckles, and other functional or ornamental objects, and in conventional coating applications. Polymers may be prepared for such purposes from the mono- or bis-aziridines alone, mixtures of the mono- and bis-aziridines, or from mixtures of mono- or bis-aziridines with other (non-fluorinated) aziridines such as 1-butyryl aziridine; glutaryl bis-(1-aziridine); 2,4,6-tris-(1-aziridinyl)-s-triazine; tris-(1-aziridinyl)phosphine oxide, etc. The monomers may be employed as intermediates in organic synthesis, for example, to form oxazolines by reaction with an alkali iodide or in synthesis of amides by reaction with an acid such as hydrochloric. These syntheses are typified by the following:

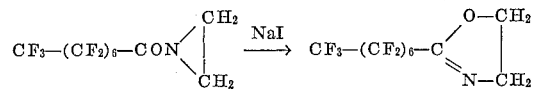

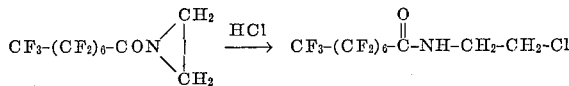

EXAMPLES

The invention is further demonstrated by the following illustrative examples. The various tests described in the examples were carried out as described below:

Oil repellency: The 3M oil repellency test described by Grajeck and Petersen, Textile Research Journal, 32, pages 320–331, 1962. Ratings are from 0 to 150, with the higher values signifying the greater resistance to oil penetration.

Water repellency: AATC spray test, method 22–1952. Ratings are from 0 to 100 with the higher values signifying greater resistance to water penetration.

Home laundering procedure: An agitator-type home washing machine was operated under the following conditions: Low water level (about 11 gal.); wash temperature, 115–125° F.; rinse temperature, 95–115° F.; normal agitation; 12-minute wash cycle; load—2 pounds ballast plus samples, total weight not exceeding 4 pounds; 100 cc. "Tide" detergent. Washed samples were dried 15 minutes in a forced draft oven at 160° F.

Accelerator shrinkage test: The fabric samples (5" x 6") were milled at 1780 r.p.m. for 2 minutes at 40° C. in an Accelerator with 1% sodium oleate solution, using a liquor-to-fabric ratio of about 50 to 1. After this washing operation, the samples were measured to determine their area and the shrinkage calculated from the original area. The Accelerator is described in the American Dyestuff Reporter 45, page 685, Sept. 10, 1956. The 2-minute wash in this device is equal to approximately 15 home launderings.

Fabric breaking strength: ASTM Method D39–40, cut strip method, 6 x 1-in. samples, 3-in. gauge, 20 sec. to break.

Wrinkle recovery: ASTM test method D1295–53T, using the Monsanto Wrinkle Recovery Tester.

Flexural rigidity: The Cantilever Procedure, ASTM D1388–55T.

Tear test: ASTM Method D1424–56T, using the Elmendorf falling pendulum tester.

Abrasion resistance: Stoll Abrader, ASTM designation: D1175–55T.

*Example 1*

PREPARATION OF 1-(PERFLUOROOCTANOYL) AZIRIDINE

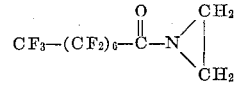

Into a 250-cc., 3-neck flask equipped with a magnetic stirrer was placed 50 cc. of diethyl ether, 2.28 cc. of ethylene imine (0.044 mole), and 6 cc. of triethyl amine (0.044 mole). The solution was cooled to minus 30° C. and 18.3 g. (0.044 mole) of perfluorooctanoly chloride [C$_7$F$_{15}$—COCl] were added slowly with a syringe through a side port. After the addition, the precipitated triethylamine hydrochloride was removed from the solution by filtration. Six grams of the hydrochloride were collected, indicating 100% conversion of the acid chloride. The ether was removed from the filtrate on a flash evaporator, leaving the greenish-yellow liquid product—1-(perfluorooctanoyl) aziridine.

The infra-red spectrum of the product confirmed the 1-fluoroacyl aziridine structure with absorption at $3.4\mu$ and $3.5\mu$ (C–H),$5.8\mu$ (>C=O amide) and between $8-9\mu$ (C–F). A portion of the product was purified by distillation—B.P., 44° C. at 0.1 to 0.2 mm.

*Example 2*

POLYMERIZATION OF 1-(PERFLUOROOCTANOYL) AZIRIDINE

After removal of ether from the filtrate referred to in Example 1, the liquid product, 1-perfluorooctanoyl aziridine, was allowed to stand at room temperature. After approximately ½ to 1 hour, spontaneous exothermic polymerization occurred, yielding a light-brown, solid polymer having an inherent viscosity of 0.15 in 1,3-bis-trifluoromethyl benzene at 22° C., melting point, 142–155° C. A sample of the polymer on pressing at 135° C. and 1000 p.s.i. gave a clear, brittle, light brown film. The polymer was found to be soluble in benzotrifluoride and 1,3-bis-(trifluoromethyl)benzene but insoluble in carbon tetrachloride and N,N-dimethylformamide.

*Analysis.*—Calculated for $C_{10}H_4NOF_3$: C, 27.33; F, 64.92; N, 3.2; H, 0.9. Found: C, 27,33; F, 64.2; N, 3.4; H, 1.34.

The carbonyl absorption in the infra-red had shifted from $5.8\mu$ in the monomer to $5.92\mu$ in the polymer. New absorption bands also occurred in the polymer at $3.05\mu$ (N-H stretch) and $6.5\mu$ (secondary amide).

*Example 3*

PREPARATION OF 1-(PERFLUOROBUTYRYL) AZIRIDINE

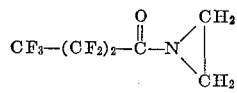

A 2-necked, 500-ml. flask equipped with a stirring bar, nitrogen inlet and rubber septum was dried and flushed with nitrogen. Two hundred cc. of anhydrous diethyl ether, and 18 cc. (0.132 mole) of triethylamine, and 6.8 cc. (0.132 mole) of ethylene imine were added to the flask and the contents were placed under a nitrogen blanket and cooled in a Dry Ice-acetone bath to ca. minus 30° C. The mixture was stirred and 30 g. (0.132 mole) of perfluorobutyryl chloride ($CF_3$—$(CF_2)_2$—COCl) were added slowly with stirring. The precipitated triethylamine hydrochloride was rapidly filtered from the cold ethereal solution and the ether was removed from the filtrate by evaporation on a rotary evaporator. Twenty-two grams of crude product were obtained and purified by distillation under reduced pressure; the purified liquid product had a boiling point of 36° at 11 mm. Calculated for $C_6F_7H_4NO$: C, 30.12; F, 55.64; H, 1.7. Found: C, 29.90; F, 54.35; H, 1.98. Infra-red analysis of the product showed the expected C-H stretching at $3.4\mu$ and the amide carbonyl bond at $5.8\mu$.

*Example 4*

POLYMERIZATION OF 1-(PERFLUOROBUTYRYL) AZIRIDINE

A portion of the purified product of Example 3 was placed in a dry, 2-oz. screw-cap vial and allowed to stand at room temperature overnight. A white opaque polymer was formed which softened at 190° C. and which yielded clear films on pressing. Infra-red analysis of the polymer revealed a shift in the carbonyl absorption from $5.8\mu$ to $5.95\mu$ and the presence of new bonds at $3.02\mu$ (N—H stretch) and $6.5\mu$ (secondary amide bond).

*Example 5*

PREPARATION OF PERFLUOROGLUTARYLBIS-(1-AZIRIDINE)

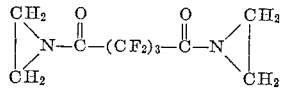

Into a blendor were placed 50 g. ice, 50 g. benzene, 4.0 g. NaOH (0.1 mole), and 5.6 cc. ethylene imine (0.1 mole). After stirring for a few minutes to dissolve the NaOH, 14 g. (0.05 mole) of perfluoroglutaryl chloride [ClCO(CF$_2$)$_3$COCl] were added over a period of 10–15 minutes. The temperature was maintained at about 5° C. during this time by addition of ice as needed. The benzene layer was then separated and dried over CaSO$_4$. The water layer was extracted with 20 cc. of diethyl ether and the ether and benzene layers combined. The ether and most of the benzene were removed on a flash evaporator, leaving 20 grams of liquid product. The infra-red spectrum of the product confirmed the bis-aziridine structure. Absorption was noted at $3.3\mu$ (C—H), $5.8\mu$ (>C=O, amide) and in the $8-9\mu$ region for C–F absorption.

*Example 6*

POLYMERIZATION OF PERFLUOROGLUTARYLBIS-(1-AZIRIDINE)

The bis-aziridine product of Example 5 was allowed to stand at room temperature until exothermic spontaneous polymerization occured (1 hr.), yielding a light brown, clear solid which was extremely brittle, insoluble in all solvents and which did not melt: charring occurred at about 270–280° C. These are typical characteristics of a highly cross-linked, three-dimensional polymer.

*Example 7*

PREPARATION OF 1 - (12,12,13,13,14,14,15,15,16,16,17,17,18,18,18 - PENTADECAFLUOROOCTADECANOYL)AZIRIDINE

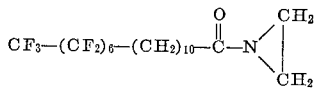

The compound 12,12,13,13,14,14,15,15,16,16,17,17,18,18,18-pentadecafluorooctadecanoic acid (M.P. 83° C.), prepared in known manner by the free radical addition of 7-iodoperfluoroheptane to 10-undecenoic acid and subsequent reduction of the iodide, was converted to the acid chloride with thionyl chloride and the acid chloride,

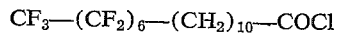

was reacted with equimoler quantities of ethylene imine and triethylamine in ether at −30° C. The product is more stable than compounds such as 1-perfluorooctanoyl aziridine owing presumably to the decreased electronegativity of the fluoroacyl group. The compound could be polymerized by application of heat, e.g., 80–100° C., preferably with the addition of small amounts of an acid such as HCl, or boron trifluoride.

*Example 8*

APPLICATION OF 1-PERFLUOROOCTANOYL AZIRIDINE TO WOOL

A quantity of 1-perfluorooctanoyl aziridine, prepared as described in Example 1, was dissolved in benzene to prepare two solutions containing 5% and 2% of aziridine, respectively. These solutions were each used to treat wool cloth in the following manner:

The cloth was immersed in the solution, then passed through squeeze rolls to provide a wet pick-up of about 100%. The treated fabric was then heated in an oven at 100° C. for 15 minutes to polymerize the aziridine on the wool fibers. After curing, the samples were weighed to determine the amount of aziridine polymer on the fabric.

The fabric samples were then subjected to tests for oil repellency, water repellency, and shrinkage. The results are tabulated below:

| Amount of polymer on fabric | Oil repellency | | Water repellency | | Area shrinkage after 5 home launderings, percent |
|---|---|---|---|---|---|
| | Initial | After 5 home launderings | Initial | After 5 home launderings | |
| 4.0 | 110 | 70 | 70 | 70 | 2 |
| 1.5 | 90 | 50 | 70 | 50 | 7 |
| None | 0 | | 50–60 | | 15 |

*Example 9*

APPLICATION OF 1-PERFLUOROOCTANOYL AZIRIDINE AND PERFLUOROGLUTARYL BIS-(1-AZIRIDINE) TO WOOL

A mixture was prepared containing equimolar proportions of 1-perfluorooctanoyl aziridine and perfluoroglutaryl bis-(1-aziridine) and dissolved in sufficient benzotrifluoride to form a 10% solution. Wool cloth was impregnated with this solution as described in Example 8 and cured in an oven at 100° C. for 15 minutes. The product was weighed to determine the amount of polymer, then extracted in a Soxhlet extractor with benzotrifluoride for 5 hours and weighed again to determine the loss in weight due to solution of polymer. Also, the oil repellency of the product was determined before and after the extraction. The results are tabulated below:

| Amount of polymer on fabric, percent | | Oil repellency | |
|---|---|---|---|
| Before extraction | After extraction | Before extraction | After extraction |
| 10 | 9 | 50 | 50 |

*Example 10*

APPLICATION OF POLYMERIZED 1-PERFLUOROOCTANOLY AZIRIDINE TO WOOL

Solutions, in benzotrifluoride, were prepared of the polymer of 1-perfluorooctanoyl aziridine described in Example 2. Wool cloth was immersed in these solutions, then pressed to a wet pick-up of about 100%. The fabric samples were dried and cured at 100° C. for 15 minutes.

The treated wool samples were subjected to various tests with the following results:

| Amount of polymer | Oil repellency | Water repellency |
|---|---|---|
| 3.0 | 120 | 100 |
| 1.5 | 110 | 100 |
| 0.4 | 90 | 100 |
| 0.2 | 90 | 90 |
| None | 0 | 50–60 |

*Example 11*

APPLICATION OF PERFLUOROGLUTARYLBIS-1-AZIRIDINE TO WOOL

Solutions in benzene were prepared of monomeric perfluoroglutarylbis-1-aziridine, as described in Example 5. Wool cloth samples were immersed in these solutions, then pressed to a wet pick-up of about 100%. The fabric samples were then dried and cured at 100° C. for 15 minutes.

The treated wool samples were tested for shrinkage by the Accelerotor method described above. The results are tabulated below:

| Amount of polymer on fabric, percent | Area shrinkage, percent |
|---|---|
| 13 | 8 |
| 6 | 13 |
| None (control) | 27 |

*Example 12*

Samples of wool which had been treated with 1-(perfluorooctanoyl)aziridine and perfluoroglutarylbis-1-aziridine, as described herein, were tested for various properties, in conjunction with a sample of the untreated wool. The results are tabulated below:

| Polymer | Amount of polymer on fabric, percent | Flexural rigidity (warp), mg.-cm. | Wrinkle recovery (warp), deg. | Fabric break strength (warp), lbs. | Fabric tear, Elmendorf, gm | Abrasion resistance, cycles |
|---|---|---|---|---|---|---|
| PFO Az[1] | 10 | 226 | 102 | 21.1 | 18 | 535 |
| PFG Az[2] | 8 | 217 | 117 | 16.1 | 17 | 677 |
| Control | 0 | 100 | 94 | 15.2 | 17 | 5.03 |

[1] PFO Az = polymer of 1-(perfluorooctanoyl)aziridine.
[2] PFG Az = polymer of perfluoroglutarylbis-1-aziridine.

Having thus described the invention, what is claimed is:

1. A process of treating textile material to improve its shrinkage and repellancy properties which comprises impregnating textile material with a perfluoroacyl bis-(1-aziridine) of the structure:

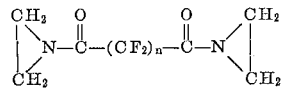

wherein $n$ is an integer from 3 to 10, dispersed in an inert liquid, and polymerizing said aziridine compound on the textile material.

2. The process of claim 1 wherein $n$ has a value from 5 to 10.

3. The process of the claim 1 wherein the perfluoro bis-(1-aziridine) is perfluoropimelyl bis-(1-aziridine).

4. The process of claim 1 wherein the textile material is wool.

5. Textile material impregnated with a polymer of a perfluoroacyl bis-(1-aziridine) of the structure:

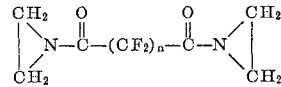

wherein $n$ is an integer from 3 to 10.

6. The product of claim 5 wherein $n$ has a value from 5 to 10.

7. The product of claim 5 wherein the aziridine is perfluoropimelyl bis-(1-aziridine).

8. The product of claim 5 wherein the textile material is wool.

References Cited by the Examiner

UNITED STATES PATENTS

| | | | |
|---|---|---|---|
| 2,502,478 | 4/1950 | Padbury et al. | 8—116.3 X |
| 2,523,470 | 9/1950 | Dropa et al. | 8—116.3 X |
| 3,198,754 | 8/1965 | Ahlbrecht et al. | 8—116.2 X |

NORMAN G. TORCHIN, *Primary Examiner.*

H. WOLMAN, *Assistant Examiner.*